Patented June 23, 1942

2,287,119

UNITED STATES PATENT OFFICE 2,287,119

PROCESS FOR PURIFYING HYDROCARBON PRODUCTS

Albert J. Mueller, Sarnia, Ontario, Canada, assignor to Standard Oil Development Company, a corporation of Delaware No Drawing. Application February 2, 1939, Serial No. 254,149

9 Claims. (Cl. 196—147)

The present invention relates to an improved process for purifying hydrocarbon products and more specifically for refining petroleum fractions. The process and the invention will be fully understood from the following description.

In the refining of hydrocarbon products, petroleum fractions, such as lubricating oil, waxes and the like, one object is to remove various impurities containing sulfur, nitrogen and other such elements. Another object is to remove asphaltic, darkly colored materials or unstable bodies which give rise to darkly colored materials on standing either due to oxidation or other causes. One step in the refining of such oils and waxes is the purification by means of solid adsorbents, such as fuller's earth, activated natural clays or similar synthetic adsorbents. The adsorbents, whether natural or artificial, are of siliceous character, hydrosilicates or gels, or hydrogels. The present invention deals with an improvement in the purification of oils by such siliceous adsorbents.

The refining of oils, waxes and the like is preferably carried out under elevated temperatures and contact between the material to be purified and the adsorbent may be effected in any convenient method; for example, the material treated may be percolated through a deep bed of the adsorbent or may be forced upwardly through a column of material which is present in the form of small granules. If desired, the adsorbent may be reduced to fine powder and added to the oil, thoroughly mixed and finally separated therefrom by filtration or centrifugation. The refining results in an improved color and the amount of the adsorbent is ordinarily adjusted so as to obtain the particular color desired in the final product.

It has now been found that an improved purification can be obtained if before contact with the hydrocarbon, the adsorbent is wetted with a low molecular weight aliphatic alcohol. The advantage gained may be exploited in either of two different ways. If a good color reduction is desired, as is generally the case, it may be obtained by the use of less adsorbent material, which has been wetted according to the present process, rather than by the use of the dry adsorbent. On the other hand, a greater color reduction can be obtained by an equal weight of a clay or other adsorbent which has been wetted than by the use of the unwetted adsorbent.

The alcohols that can be employed in the present invention are the low molecular weight aliphatic alcohols either C. P. or "commercial" grade and all of these are found to be quite satisfactory. Methyl, ethyl and isopropyl alcohols are perhaps the cheapest and the most readily available and for this reason they are preferred, but it will be understood that higher alcohols such as hexyl up to decyl or thereabout can be used with substantially the same results.

The wetting may be accomplished in any desired manner, for example, by adding alcohol to clay to form a thick slurry and using the slurry in subsequent contacting, or by passing a stream of the alcohol through a body of the granular adsorbent, or a powdered adsorbent may be sprayed with the alcohol. In any case, the purpose is to fully wet the adsorbent surface.

After the clay or other adsorbent is wetted, the oil or other petroleum product to be purified is brought into contact. The petroleum product is preferably heated to an elevated temperature in order to make the adsorption more rapid, and in the case of very viscous materials it is advantageous to dilute them with naphtha or kerosene before such treatment. Liquefied, normally gaseous hydrocarbons or mixtures thereof, such as propane and butane, may be employed instead of naphthas and with such materials the treatment is preferably carried out at room temperature or even somewhat lower, but elevated temperatures can be employed at pressures above atmospheric.

The oil is separated from the treating material and the diluent naphtha is distilled off and recovered. The refining agent may be recovered by burning or by treating with suitable solvents to remove the adsorbed impurities. In this way the material may be regenerated to substantially its initial adsorptive capacity.

While the present invention is useful in the refining of hydrocarbon lubricating oils, it is of particular advantage in the refining of waxes where extremely high color, preferably obtained at relatively low temperatures to prevent "cracking," is desirable, and also in the refining of oils which have been carefully treated with fuming or very concentrated sulfuric acid for the preparation of the so-called white oils of commerce, for which low temperature contacting with adsorbent is desirable to prevent oxidation and taste deterioration.

The following examples are illustrative of the method and the improvements obtained:

The oil treated with a phenol extracted distillate having a viscosity of 72 sec. Saybolt at 210° F. and an initial color of 1½ Robinson; that is to say the color obtained by the prior refining treatments up to the point where it is to receive the purification by the solid adsorbents. The oil was divided into several samples and each was brought into contact with a solid adsorbent which was a fresh acid treated clay of commerce. The temperature of the treatment was 300° F., and in each case the amount of the clay to oil was precisely the same (12.5 lbs./bbl.). In one case the raw clay, as received, was employed according to the usual refinery practice; in the other instance the clay was first wetted with equal volumes of different alcohols. The degree of refinement of the various samples was then judged by the color of the oil. Data are given in the following table:

| Clay used | Color of sample |
| --- | --- |
| No clay | 1½ Robinson. |
| Fresh raw clay | 5¼ |
| Same wetted with methyl alcohol | 6¾+ |
| Same wetted with ethyl alcohol | 7¼ |
| Same wetted with n-butyl alcohol | 6¾ |
| Same wetted with sec-hexyl alcohol | 7¼ |
| Same wetted with mixture of alcohols of 6 to 10 carbon atoms | 6+ |

It will be observed that in each case where the clay was wetted with low molecular weight alcohol, a substantial improvement in color resulted over and above that obtained with the same quantity of an unwetted clay.

The present invention is not to be limited by any theory of the mechanism of the improvement or to any method for bringing oil in contact with the clay or for effecting the wetting of the clay with alcohol, but only to the following claims in which it is desired to claim all novelty inherent in the invention.

I claim:

1. The process of removing soluble impurities from a hydrocarbon product which comprises bringing the hydrocarbon product into contact with a solid adsorbent for such impurities, said adsorbent being wetted with a substantially pure low molecular weight aliphatic alcohol.

2. Process according to claim 7 in which the solid adsorbent is wetted with an alcohol of from 1 to 10 carbon atoms.

3. Process according to claim 7 in which the solid adsorbent is wetted with ethyl alcohol.

4. The process of removing soluble impurities from a hydrocarbon product which comprises wetting a solid siliceous adsorbent for such impurities with a substantially pure low molecular weight aliphatic alcohol, then bringing the hydrocarbon product into contact with said wetted adsorbent.

5. Process according to claim 4 in which the adsorbent is a clay.

6. Process according to claim 4 in which the adsorbent is an acid treated clay.

7. The process of removing impurities from a hydrocarbon product which comprises bringing a dry solid adsorbent for such impurities into contact with a substantially pure low molecular weight aliphatic alcohol in order to wet said adsorbent with said alcohol, then bringing said hydrocarbon product into contact with the adsorbent thus wetted.

8. Process according to claim 7 in which the alcohol is ethyl alcohol.

9. The process of decolorizing a hydrocarbon product which comprises bringing the hydrocarbon product into contact with an adsorbent clay, said clay being wetted with substantially pure ethyl alcohol.

ALBERT J. MUELLER.